United States Patent [19]
Ma et al.

[11] 3,953,786
[45] Apr. 27, 1976

[54] EXTERNAL CHARGING CIRCUIT FOR STATIC SWITCH

[75] Inventors: Hsiao J. Ma, Des Plaines; George H. Studtmann, Mount Prospect, both of Ill.

[73] Assignee: Borg-Warner Corporation, Chicago, Ill.

[22] Filed: Mar. 29, 1971

[21] Appl. No.: 128,752

[52] U.S. Cl. .................................... 321/45 C
[51] Int. Cl.² ................................ H02M 7/515
[58] Field of Search ... 321/2, 5; 321/45 C; 318/227

[56] References Cited
UNITED STATES PATENTS

| | | | |
|---|---|---|---|
| 3,207,974 | 9/1965 | McMurray | 321/45 C |
| 3,354,370 | 11/1967 | Corry et al. | 321/45 C |
| 3,355,654 | 11/1967 | Risberg | 321/45 ER |
| 3,403,318 | 9/1968 | Krauthamer et al | 321/5 |
| 3,474,320 | 10/1969 | Chandler | 318/227 X |
| 3,559,038 | 1/1971 | Krauthamer | 321/45 C |
| 3,568,021 | 3/1971 | Turnbull | 321/45 C |
| 3,628,126 | 12/1971 | Kawakami et al. | 321/45 C |

FOREIGN PATENTS OR APPLICATIONS

| | | | |
|---|---|---|---|
| 226,012 | 3/1969 | U.S.S.R. | 321/5 |
| 1,371,933 | 8/1964 | France | 321/45 C |

*Primary Examiner*—William M. Shoop
*Attorney, Agent, or Firm*—James J. Jennings, Jr.

[57] ABSTRACT

A static switch including main and auxiliary SCR's has a commutating capacitor coupled between the common connections of these main and auxiliary SCR's. An independent external charging circuit is provided and connected to complete a charging path for the commutating capacitor which is isolated by at least one diode from the main d-c bus. This enables the commutating capacitor to charge to a level above that of the d-c bus voltage and maintain effective commutation.

3 Claims, 5 Drawing Figures

Inventors
Hsiao J. Ma
George H. Studtmann
By James J. Jennings, Jr.
Attorney

EXTERNAL CHARGING CIRCUIT FOR STATIC SWITCH

BACKGROUND OF THE INVENTION

In the field of a-c motor control it is now common practice to utilize an inverter for energizing the motor, and any of various d-c voltage sources to supply the inverter. By regulating the level of the d-c voltage supplied to the inverter the amplitude of the a-c voltage passed to the motor is regulated. By controlling the firing times of the semiconductor switches in the inverter the frequency of the a-c voltage passed to the motor can be controlled. For certain conditions, such as the maintenance of a constant torque output, it is common practice to operate the system so as to maintain substantially constant the ratio of the voltage amplitude to the frequency of the same a-c voltage supplied to the motor; generally this is termed "constant volts-per-cycle" operation. When this system is utilized, during start-up or other conditions where the d-c voltage supplied to the inverter is low, those inverters which utilize capacitors for commutation may be charged to a level insufficient for effective commutation. Accordingly the capability of the inverter to commutate a given value of load current decreases as the level of the d-c bus voltage is decreased.

Those skilled in the art have appreciated that to remedy this situation an external charging circuit can be provided; sometimes this is termed an auxiliary or pre-charge circuit. Such arrangements have been implemented for the simpler inverter configurations. However, for a more complex arrangement in which a pair of series-coupled main SCR's are utilized to switch the load currents, and a pair of auxiliary SCR's are connected in a circuit to commutate the main power handling SCR's, a practical external charging arrangement has not yet been developed. It is therefore a primary consideration of this invention to provide an effective external charging circuit for an inverter circuit utilizing auxiliary SCR's in the commutation of the main SCR's.

SUMMARY OF THE INVENTION

The present invention is useful in a switching circuit which includes a pair of reference conductors connected to receive a main energizing voltage from a pair of d-c input conductors, conventionally termed the d-c bus. A pair of main semiconductor switches or SCR's is coupled in series between the reference conductors, and a pair of auxiliary SCR's are similarly coupled in series between the same reference conductors. A commutating capacitor has one plate coupled to the common connection between the main SCR's and the other plate coupled to the common connection between the auxiliary SCR's. At least one commutating inductor is connected to be in a series path with the capacitor as it is discharged during the commutating interval.

Particularly in accordance with the present invention, at least one auxiliary conductor is connected to receive energy over a path which is independent of the main energizing voltage received over the d-c input conductors. At least one isolating diode is coupled between the auxiliary conductor and one of the d-c input conductors. An external source of energy is provided to charge the commutating capacitor. Thus energy is supplied over the independent path to replenish the commutating losses in the switching circuit.

THE DRAWINGS

In the several figures of the drawings like reference numerals identify like elements, and in the drawings.

DETAILED DESCRIPTION OF THE INVENTION

Figure 1:
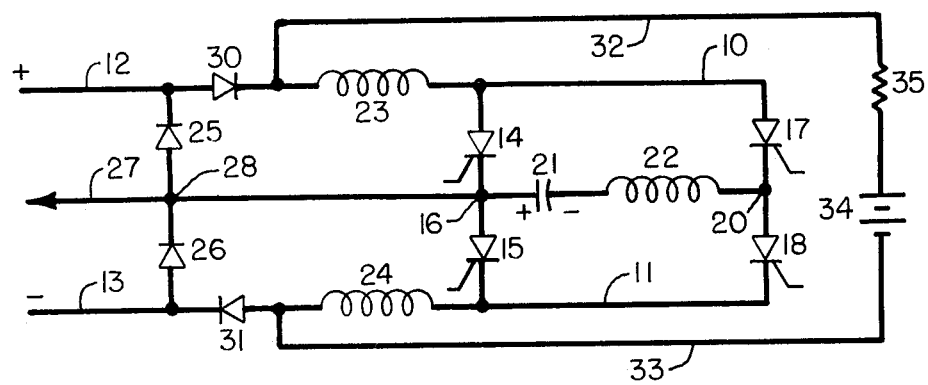
FIG. 1 is a schematic diagram illustrating a preferred embodiment of the present invention in conjunction with an inverter utilizing auxiliary SCR's for commutation.

In FIG. 1 a pair of reference conductors 10 and 11 are shown, and these conductors receive the main energizing voltage from the d-c input conductors 12, 13. Main semiconductor switches or SCR's 14, 15 are coupled in series between the reference conductors 10, 11. Numeral 16 designates a first common connection, made between the cathode of SCR 14 and the anode of SCR 15. Auxiliary SCR's 17, 18 are similarly coupled in series between reference conductors 10, 11 and have a second common connection point 20 between the cathode of SCR 17 and the anode of SCR 18. Commutating capacitor 21 has one plate coupled directly to the first connection 16, and the other plate coupled over a commutating inductor 22 to second connection point 20. Additional commutating inductors 23, 24 are shown coupled between the d-c bus conductors 12, 13 and the reference conductors 10, 11. Diodes 25, 26 are coupled in series between the d-c input conductors 12, 13 to complete a path for discharge of capacitor 21 during the commutating interval. A load conductor 27 is coupled to the common connection 28 between the main SCR's. Isolating diodes 30, 31 are shown coupled between the d-c input conductors 12, 13 and the additional commutating inductors 23, 24. These diodes are not a part of the basic inverter circuit but instead form a part of the invention to be described hereinafter.

The gating circuits for the SCR's have been omitted for the sake of simplicity but their connection and operation is well known and understood. It is assumed that capacitor 21 has been charged with a voltage of the polarity indicated in FIG. 1. It is also assumed that SCR 14 has been gated on. To turn off main SCR 14, a gating pulse is applied to auxiliary SCR 17 to turn that switch on and complete a discharge path for capacitor 21. The capacitor begins to discharge backward through SCR 14. When the level of this discharge or ringing current reaches the level of the load current previously flowing over conductor 27 to the load, main SCR 14 is shut off and the ringing current then flows through diodes 25, 30, commutating inductor 23, auxiliary SCR 17 and commutating inductor 22. At the end of the commutating interval capacitor 21 will be charged with a polarity opposite that indicated in FIG. 1. Thus the circuit is prepared for the subsequent half cycle of operation, during which SCR 18 will be gated on to turn off main SCR 15. Loss of energy in the commutating capacitor is in general made up by conduction through the gated-on auxiliary SCR and its associated circuit components.

Particularly in accordance with the present invention a pair of auxiliary conductors 32, 33 are connected to receive a commutating voltage which is independent of the main energizing voltage applied to d-c input conductors 12, 13. In the illustrated embodiment a battery 34 is shown providing this independent voltage but of course other energy sources such as a rectifier, fuel cell, thermoelectric module, or other unit can be employed. A resistor 35 is shown between conductor 32 and the positive side of battery 34, but depending upon circuit design it may not be necessary to incorporate resistor 35. Auxiliary conductor 32 is shown connected between isolating diode 30 and commutating inductor 23, and auxiliary conductor 33 is connected between the other isolating diode 31 and commutating inductor 24. These connections complete a charging circuit for capacitor 21 so that this capacitor can be charged to the commutating voltage level of battery 34 when this level exceeds that of the main energizing voltage provided between the d-c input conductors 12, 13.

Capacitor 21 is charged as current flows from battery 34 over resistor 35, conductor 32, inductor 23, main SCR 14, capacitor 21, inductor 22, auxiliary SCR 18, conductor 11, inductor 24 and conductor 33 to the other side of battery 34. At this time it is assumed that the load current is flowing through isolating diode 30 and main SCR 14. Neglecting the IR drops, the second isolating diode 31 is reverse biased by a voltage equal to the voltage of battery 34 minus the d-c voltage applied between conductors 12, 13. During the subsequent half cycle of operation charging of capacitor 21 with the opposite polarity is accomplished over the complementary path.

Such a circuit was successfully utilized in a three-phase bridge inverter driving a motor load over a 20/1 speed range, in substantially constant volts-per-cycle operation. The circuit successfully maintained a substantially constant turn-off time of the SCR's. No overvoltaging and no compromising of the main inverter components was experienced in the use of this circuit.

Figure 2:
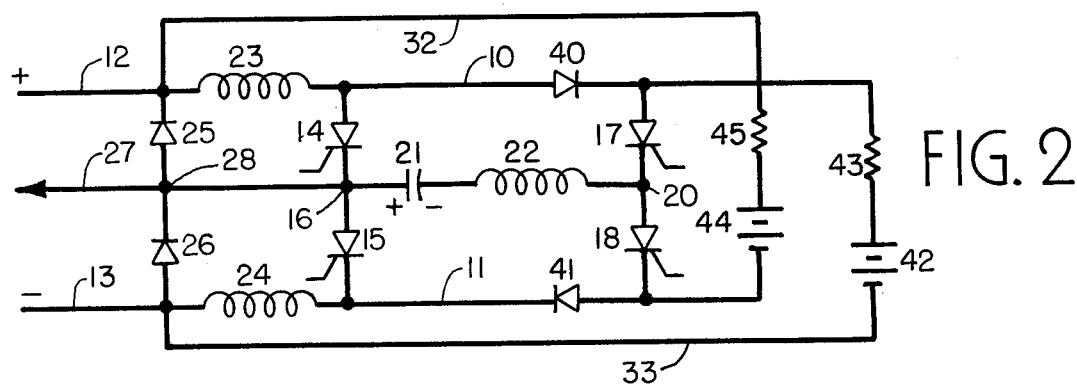
FIG. 2 is a schematic diagram illustrating another embodiment of the present invention.

In the embodiment of FIG. 2 the isolating diodes 40, 41 are connected in series with the auxiliary SCR's 17, 18 between the reference conductors 10, 11. For full-wave charging with this configuration, two power supplies are necessary. Accordingly a first battery or supply 42 is coupled between conductor 33 and a resistor 43, which resistor is connected between diode 40 and SCR 17. The other supply includes a battery 44 having one side coupled between SCR 18 and diode 41, and the other side coupled over a resistor 45 to auxiliary conductor 32. Thus charging current from battery 44 can flow over resistor 45, conductor 32, inductor 23, main SCR 14, capacitor 21, inductor 22, and auxiliary SCR 18 to the other side of battery 44. During the subsequent half cycle charging current flows from battery 42 over the complementary charging circuit which includes auxiliary SCR 17 and main SCR 15.

The circuit of FIG. 2 has the advantage that the isolating diodes can be "sized" or rated at the commutating current of one of the auxiliary SCR's 17, 18 rather than at the sum of the currents of the auxiliary and main SCR's, as is requisite with the circuit of FIG. 1. A disadvantage of the circuit of FIG. 2 is that a voltage burden is imposed on the auxiliary SCR's by reason of the addition of the commutating capacitor voltage to the voltage of the auxiliary supply. This is manifest upon tracing the path which includes battery 42, resistor 43, auxiliary SCR 17, commutating inductor 22, commutating capacitor 21, main SCR 15, commutating inductor 24, and conductor 33 back to battery 42. When the main energizing voltage on d-c input conductors 12, 13 is near zero, the voltage across the non-conducting main SCR 15 is virtually zero (assuming SCR 14 is on) and the auxiliary SCR 17 sees essentially a voltage comprised of adding the potentials of the voltage accumulated across capacitor 21 and that of battery 42. In actual practice this may mean an added voltage burden (that is, a required higher rating) on the auxiliary SCR, above that which would be required without external charging, in the range of 20 to 30%.

It is evident from considering the operation of the inverter circuit in which commutation is accomplished with auxiliary SCR's (such as 17, 18) that the commutation energy initially stored in the capacitor 21 rings around a closed loop and, except for loses, returns to the capacitor; in this return the polarity of the voltage appearing across the capacitor is reversed. Accordingly the external charging supply (or supplies) is required to supply only an amount of energy equivalent to the losses in the commutation circuit. Appreciation of this aspect makes it apparent that the external charging supply 34 of FIG. 1, and the supplies 44 and 42 of FIG. 2, need not be solid d-c sources as illustrated. These charging supplies can be any of a wide variety of pulsating or oscillating sources (either unidirectional, or else including diodes to provide unidirectional flow) which emit energy sufficiently often to maintain the proper voltage on the commutating capacitor.

Figure 3:
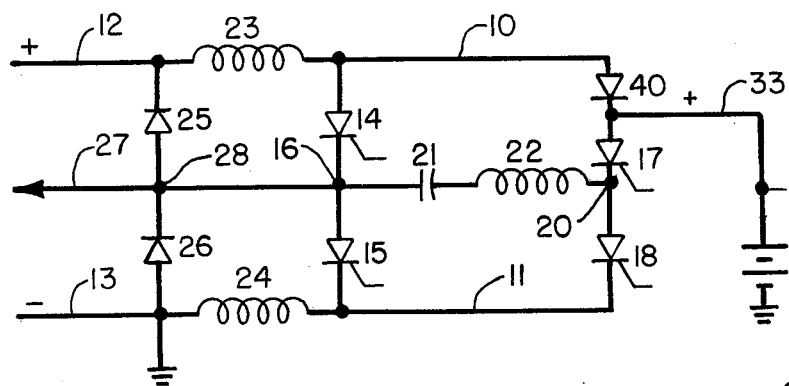
FIG. 3 is a schematic diagram depicting an additional embodiment of the invention employing periodic charging of the commutating capacitor.
Figure 4:
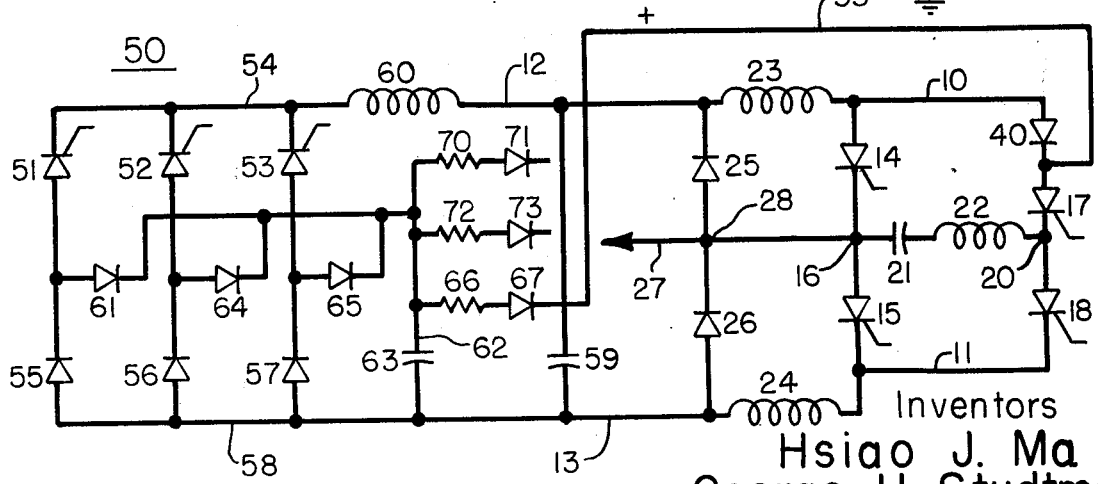
FIG. 4 is a schematic diagram of yet another embodiment of the invention which utilizes half-wave charging of the commutating capacitor in a system employing a phase-controlled power supply to obtain a variable input voltage.

Further appreciation of this intermittent charging arrangement has led to the development of a half-wave charging arrangement as shown in FIG. 3. FIG. 4 illustrates how this approach makes for ease of implementation in a system employing a variable d-c input supply. The circuit of FIG. 3 will first be described.

As there shown a positive potential is applied between isolation diode 40 and auxiliary SCR 17 by battery 77, or another suitable source 75. Such other source may be as previously mentioned, that is, pulsating in nature. Charging with this circuit is done on a half-wave basis, in that a charging path is completed once each cyle over a circuit comprising battery 77, conductor 33, auxiliary SCR 17, inductor 22, capacitor 21, main SCR 15, inductor 24, and ground to the other side of battery 77.

FIG. 4 illustrates a practical implementation of half-wave charging as applied to a system employing a phase-controlled power supply on the input to the inverter. This arrangement is particularly useful in connection with known rectifier arrangements which convert a-c input energy into d-c energy for application over d-c bus conductors 12, 13 to energize the inverter. In FIG. 4 this input rectifier arrangement is designated 50 and comprises 3 SCR's 51, 52 and 53, each of which has its cathode coupled to conductor 54. Three diodes 55, 56, and 57 each have their anodes coupled to conductor 58, and their cathodes individually coupled to one of the SCR's 51–53. A filter inductor 60 is coupled between conductors 54 and 12, and an electrolytic capacitor 59 is coupled between conductors 12 and 13, to reduce the ripple effect in the d-c voltage passed to the inverter circuit.

Another diode 61 has its anode connected between SCR 51 and diode 55, and the cathode of diode 61 is coupled to a common conductor 62. A filter capacitor 63 is coupled between conductor 62 and conductor 13. Diodes 64 and 65, like diode 61, have their anodes connected to points in the input rectifier bridge and their cathodes coupled in common with conductor 62. Thus a d-c voltage is provided at common conductor 62 for energizing the half-wave charging circuit. For the arrangement shown current flows from conductor 62 over resistor 66, diode 67, conductor 33, auxiliary SCR 17, inductor 22, capacitor 21, main SCR 15, and inductor 24 to conductor 13, to supply the commutation circuit losses when auxiliary SCR 17 is gated on. Resistor 70 and diode 71 supply a similar voltage to a second phase circuit of the inverter, and resistor 72 and diode 73 pass a similar energizing voltage to the third phase circuit.

Figure 5:
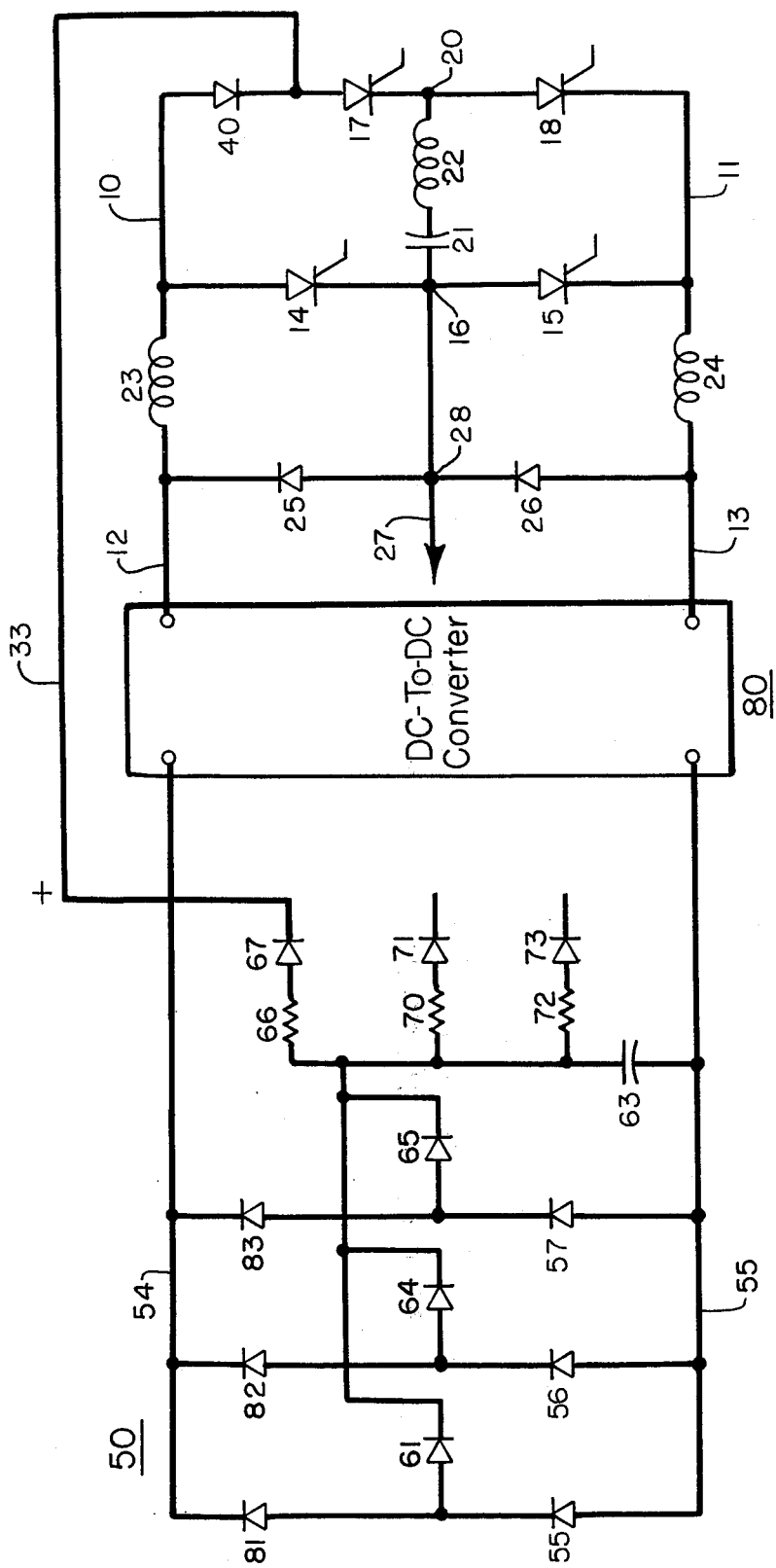
FIG. 5 is a schematic diagram of still another embodiment of the invention, in which the variable input voltage is supplied over a chopper circuit.

FIG. 5 illustrates a variation of the circuit in FIG. 3, as applied to a system obtaining a variable input voltage over a "chopper" or dc-to-dc converter 80. The input rectifier arrangement 50 is generally similar to that depicted in FIG. 4, but the SCR's 51-53 have been replaced by diodes 81-83. Accordingly the level of the d-c voltage supplied by the input rectifier arrangement and translated to the input side of dc-to-dc converter 80 is virtually constant. The operation of the unit 80 is well known and understood, and provides a controllable voltage at the conductors 12, 13. The remainder of the circuit operates as already described in connection with FIGS. 3 and 4.

Those skilled in the art will appreciate that the different circuits described above lend themselves to different uses. By way of example the auxiliary charging circuit in FIG. 1 is useful with high-power inverters, and does not impose an added burden (that is, somewhat increased voltage rating) on the auxiliary SCR's. On the other hand the circuit of FIG. 4 lends itself to low-power systems where economy is important. It may find use for example in systems of the order of 2 horsepower. The circuit of FIG. 4 does add a voltage burden but only to one auxiliary SCR. This circuit also has a slightly reduced turn-off time on the other main SCR.

The circuits described above have successfully provided substantially constant turn-off time of the SCR's, as the inverter energized a motor driven over a 20/1 speed range at an approximately constant volts/cycle ratio. These circuits have been shown and explained in conjunction with an auxiliary-commutated inverter arrangement having three commutating inductors, such as 22, 23 and 24. However those skilled in this art will appreciate that the same external charging circuits can be connected and operated in exactly the same manner for an inverter circuit which omits inductors 23 and 24, or for a circuit which omits commutating inductor 22 and utilizes only two inductors such as 23 and 24.

While only particular embodiments of the invention have been described and illustrated, it is manifest that various modifications and alterations may be made therein. It is therefore the intention in the appended claims to cover all such modifications and alterations as may fall within the true spirit and scope of the invention.

What is claimed is:

1. In a switching circuit including a pair of reference conductors for receiving a main energizing voltage from a pair of d-c input conductors, a pair of main semiconductor switches connected in series between the reference conductors with no other component between the main semiconductor switches, a pair of auxiliary semiconductor switches coupled in series between the reference conductors, a first pair of diodes coupled in series between the d-c input conductors and connected in a sense opposite the connection of the main and auxiliary semiconductor switches, with the common connection between the diodes being coupled to the common connection between the main semiconductor switches, and a series circuit including an inductor and a commutating capacitor coupled between the common connection between the main semiconductor switches and the common connection between the auxiliary semiconductor switches, the improvement which comprises a pair of auxiliary conductors connected to receive energy over a path which is independent of the main energizing voltage and to complete a charging circuit with the commutating capacitor, which charging circuit includes a main semiconductor switch connected to one of said reference conductors and the auxiliary semiconductor switch which is connected to the other of said reference conductors, a first isolating diode, coupled between one of the d-c input conductors and the charging circuit, and a second isolating diode, coupled between the other d-c input conductor and the charging circuit, so that the commutating capacitor can be charged to the commutating voltage level when it exceeds the level of the main energizing voltage present on the d-c input conductors.

2. A switching circuit as claimed in claim 1 and further comprising a resistor coupled in series with one of the auxiliary conductors.

3. A switching circuit as claimed in claim 1 and further comprising a resistor and a source of d-c voltage coupled in series between the auxiliary conductors.

* * * * *